CATHODE RAY TUBE BRIGHT SPOT ELIMINATING CIRCUIT

Filed May 23, 1967

INVENTORS
TAKAMARO HORIO
MASANOBU TSUGITA
BY Roberts & Cohen
ATTORNEYS

United States Patent Office 3,448,328

Patented June 3, 1969

3,448,328

CATHODE RAY TUBE BRIGHT SPOT ELIMINATING CIRCUIT

Takamaro Horio and Masanobu Tsugita, Osaka, Japan, assignors to New Nippon Electric Co., Ltd., Osaka, Japan Filed May 23, 1967, Ser. No. 640,642
Claims priority, application Japan, May 30, 1966, 41/34,893
Int. Cl. H01j 29/70
U.S. Cl. 315—20 2 Claims

ABSTRACT OF THE DISCLOSURE

A cathode ray tube bright spot eliminating circuit wherein the charge stored in the anode of the cathode ray tube is rapidly discharged by connecting the video signal receiving electrode of said cathode ray tube to a B-voltage supply switch directly, or through resistors, the circuit comprising a switch interlocked with the B-voltage supply switch for grounding said video signal receiving electrode directly, or through resistors, thereby bringing the potential difference between the cathode and the first grid in said cathode ray tube to zero when opening said main switch.

*Drawing*

*Detailed description*

This invention relates to circuits for quickly eliminating the bright spots produced on the screens of television receivers at the switching off of the related power supplies.

Television receivers, which originally employed vacuum tubes, have been rapidly developed to the types which are currently available. Improvements have been incorporated for building electrical equipment in small sizes such as has been accomplished, for example, in the utilization of transistors and there are now being manufactured, receivers incorporating a fairly large number of transistors in place of vacuum tubes. However, it is known that satisfactory performance cannot be simply obtained by such substitutions. In fact, it has become well known that problems arising from the inherent characteristics of transistors are first to be solved.

The elimination of the residual spot on the screen of a cathode ray tube has been one of the above-noted problems. The phenomenon of the bright spot produced on the screen of a cathode ray tube in a television receiver may be explained as follows. Electrons emitted from the cathode of a cathode ray tube of a television receiver in operation are accelerated by the high voltage of the anode and strike the fluorescent screen in the form of an electron beam. Thus, the fluorescent film is excited. Electrons being deflected by deflecting coils do not result in a bright spot on the screen. However, because a condenser of about 1000 pf. is constituted between the anode and the external conductive film of a cathode ray tube to condition a certain constant high voltage, electrons produced from the cathode due to the residual heat after the cutoff of the power supply are accelerated for a certain time by the high voltage maintained by the charge stored in the anode and are propelled in the form of an electron beam.

In a vacuum-tube type television receiver, the deflecting coils carry residual currents immediately after the switching off of the supply thereby deflecting the electron beam to a certain extent. This deflection works favorably to reduce the time during which the spot remains at the center of the fluorescent screen. However, this is still not effective enough. On the other hand, in a transistorized television receiver, no current remains in the deflecting coils even for a short period after the power supply has been switched off. Therefore, a stationary bright spot is produced at the center portion of the screen. The bright spot thus produced is most likely to appear when the power switch is opened in the cutoff state of the cathode ray tube. In other words, said spot is most likely to appear when the fluorescent screen is in the darkest state. Repetition of this spot will burn the fluorescent screen and, as a result, the life of a cathode ray tube will be remarkably shortened.

Figure 1:
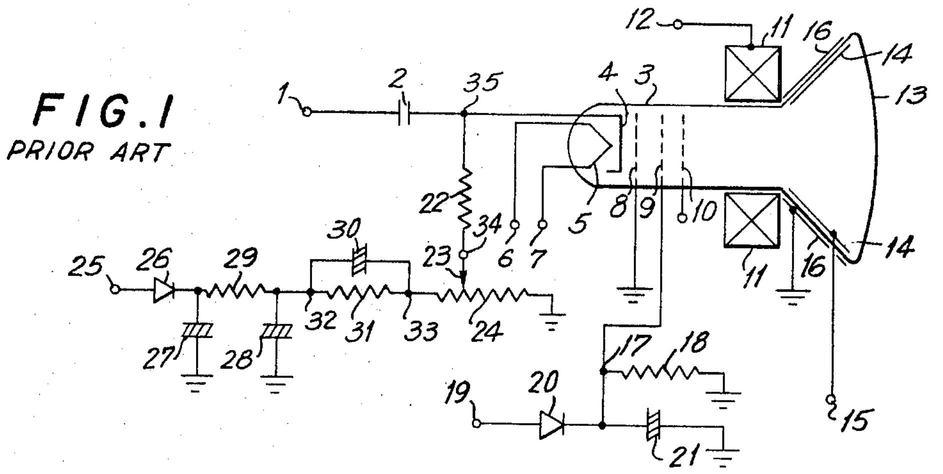
FIG. 1 PRIOR ART
FIGURE 1 is a known bright spot eliminating circuit.

For the elimination of said bright spot, various methods have been employed. A conventional example is explained below. In FIG. 1, element 1 is an input terminal for a video signal from a video output circuit, element 2 is a coupling capacitor, element 3 is a cathode ray tube, element 4 is a cathode of the cathode ray tube on which a video signal is impressed, element 5 is a heater for the cathode 4. Elements 6 and 7 are input terminals for heater 5. Element 8 is the first grid which is grounded. A second grid 9 is connected to a brightness control circuit, and element 10 is the third grid to which an appropriate voltage is applied. Input terminal 12 of a deflecting coil 11 is connected to a deflecting circuit. Element 13 is a fluorescent screen. Element 14 is an anode and to its input terminal 15 a rectified high voltage from a fly-back transformer is applied. A condenser is constituted by said anode 14 and an external conductive film 16 which is coated on the anode via the glass envelope of the cathode ray tube so as to smooth said rectified high voltage. Screen grid bias resistor 18 (several hundred kilo-ohms to one megohm) constitutes a time-constant circuit in conjunction with a smoothing capacitor 21 (3 $\mu$f.–5 $\mu$f.). Element 19 is an AC supply input terminal, element 20 is a rectifier, element 22 is a bias resistor, element 23 is a slider of a variable resistor 24 for brightness control, and element 25 is an AC input terminal for said brightness control circuit. An AC voltage impressed on input terminal 25 is rectified by a rectifier 26; then its output is coupled as a stabilized DC voltage to the brightness control circuit through a smoothing circuit consisting of capacitors 27 and 28 and a resistor 29. Values of a capacitor 30 and a resistor 31 are respectively selected to provide an appropriate time constant so that a proper spot-eliminating circuit may be constituted.

Operation of a circuit constituted such as mentioned above is described below with reference to the instance where said spot eliminating circuit is not provided. In the case where capacitor 30 (100 $\mu$f.) and resistor 31 (30K$\Omega$–50K$\Omega$) are not used, the positive charge stored in the smoothing capacitor 28 (3 $\mu$f.) discharges slowly through the brightness control resistor 24, just after the switching off of the AC power supply. This makes the first grid negative with respect to the cathode, and the bias increases in the negative direction. However, since this bias is not extremely strong due to the comparatively small capacitance of 28 (such as only about 3 $\mu$f.), electrons emitted from the cathode due to residual heat from heater 5 flow as a beam for several seconds until said capacitor has been discharged, thus causing a bright spot on the screen.

In the case where a parallel circuit of a large capacitance 30 and a resistor 31 is interposed between the smoothing circuit and the brightness control resistor as in FIG. 1, the positive charge stored in capacitor 30 is discharged through resistor 31 toward point 33 from point 32 when the power switch is opened. At this discharge, cathode 4 turns momentarily negative due to the large time constant of said parallel circuit. Thus, the bias decreases in strength, whereupon the electron beam increases rapidly and causes the anode to drop its high tension quickly. The spot can thus be quickly eliminated.

When some additions are made to the above circuit whereby one end of capacitor 21 is connected to the input side of the bias circuit connected to the second grid and the other end of said capacitor is grounded, the positive charge stored in capacitor 21 is discharged toward the ground through resistor 18 e.g. after the AC supply is opened, thereby making the second grid positive to cause the electron beam to flow into the second grid and, at the same time, to decrease the beam current. In this way, the charge in the anode is quickly discharged and, as a consequence, the displaying time of the spot is reduced.

In a vacuum-tube type television receiver, the receiver continues its operation for a while showing a decay characteristic after the cutoff of the power supply. This is because of the effect of the residual heat on the heater. For this reason, a circuit such as in FIG. 1 is good for the vacuum type receiver. However, in a transistorized television receiver, since the transistor element stops its function immediately at the cutoff of power supply, a conventional bright spot eliminating circuit cannot effectuate satisfactory performance. Furthermore since a conventional circuit such as previously described needs a large time constant to attain a good result, the size as well as the number of elements used must accordingly be increased. This introduces additional problems into apparatus which is to be constructed more compactly.

The present invention is contemplated in view of the points discussed above. By applying this invention, it will become possible to save capacitors and resistors and therefore to simplify the related circuits. Further, production cost is reduced. This invention is not only readily applicable to transistorized television receivers, but also can be utilized for those of the vacuum-tube type.

Figures 2, 3:
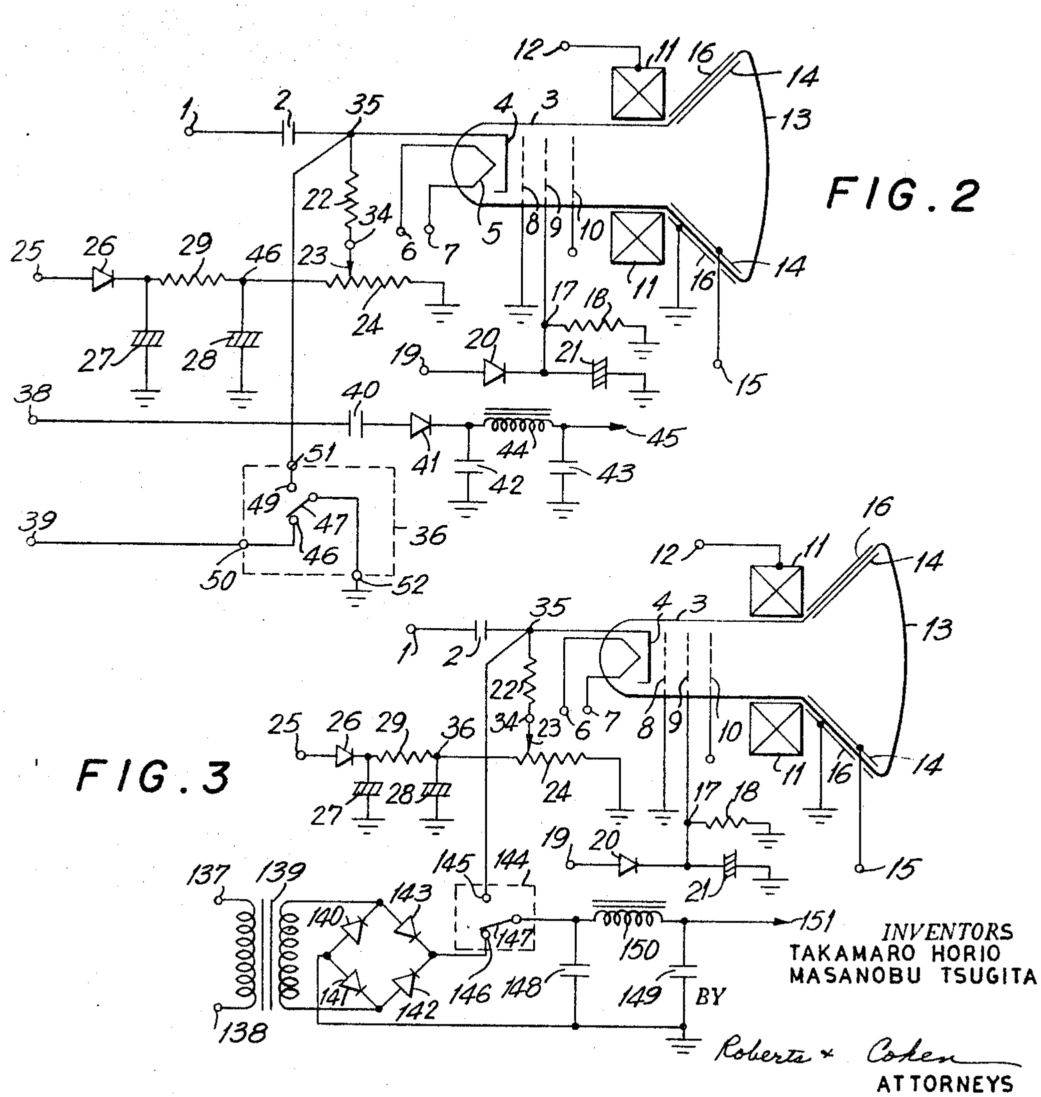
FIGURE 2 is a bright spot eliminating circuit in accordance with a first embodiment of the present invention.
FIGURE 3 is a spot eliminating circuit in accordance with a second embodiment of the present invention.

The invention is next described with reference to FIG. 2. Elements 38 and 39 in FIG. 2 are input terminals for an AC power supply, element 40 is a blocking capacitor with respect to DC, element 41 is a rectifier, elements 42 and 43 are capacitors, and element 44 is a choke coil which constitutes a smoothing circuit in conjunction with capacitors 42 and 43. The B-voltage supply is taken from a terminal 45. The input lead from the AC supply is connected to a contact 46 of a B-voltage supply switch 36. The other contact 49 of the switch is directly connected to the input point 35 of cathode 4 of cathode ray tube 13. Switching arm 47 of switch 36 (which has connection terminals 50, 51 and 52) is grounded. Said B-voltage supply switch is interlocked with a main switch for the commercial AC power supply. Other notations given in FIG. 2 are the same as in FIG. 1. The operation is next described for the circuit particularized above.

When the main switch of the receiver is placed at the off position, switching arm 47 which is interlocked with the main switch changes over from contact 46 to contact 49. At this instant, the positive charge stored in capacitor 28 is discharged to ground through brightness control resistor 24 and also through bias resistor 22, point 35 and B-voltage supply switch 36. Since this discharge is performed without giving potential to cathode 4, the cathode potential falls instantaneously to zero which is the same level as is on the first grid. This function is performed regardless of the position of slider 23 of said brightness control resistor. Consequently, cathode 4 of the cathode ray tube is immediately brought to zero potential when the AC supply is cut off.

Since no potential difference remains between cathode 4 an dthe first grid, the bias becomes extremely weak. As a result, the electron beam increases rapidly. This causes the positive charge in anode 14 to discharge instantaneously. The positive charge that arrives at the cathode flow directly to ground through B-voltage supply switch 36 without passing through resistances such as resistor 22 and the brightness control resistor. Accordingly, the bias is not automatically strengthened even a little due to these resistors. This function insures the effectiveness of the present invention.

Further, contact 49 of B-voltage supply switch 36 may be connected either to output terminal 34 of slider 23 of the brightness control resistor or to input terminal 46 of said resistor. However, in either case, the functional efficiency becomes a little less than that in the case where the B-voltage supply switch 36 is connected directly to cathode 4. In applying the method described above, it is not necessary to increase the time constant provided through resistor 18 and capacitor 21 which have connections to the second grid.

In this embodiment there have been described the arrangement in which a video signal is impressed upon the cathode of a cathode ray tube. This invention can also be applied in the arrangement in which a video signal is impressed upon the first grid.

It is to be noted that application of this invention will make a cathode ray tube capable of eliminating the effect of a bright spot because a positive charge on the anode is completely discharged before the raster completes its contraction following the opening of the main switch. In addition, this invention permits utilization of a commercally available and conventional switch without adding modifications to it. Further, the circuit can be simplified by the application of this invention. For these reasons, the application of the present invention will serve to advantage in many ways such by reducing production costs and also in making the apparatus dimensionally small.

The invention is next further elucidated with reference to the embodiment on FIG. 3. In FIG. 3, elements 137 and 138 are input terminals for an AC power supply, element 39 is a power transformer, elements 140, 141, 142 and 143 are diodes connected to form a bridge rectifier, element 144 is a B-voltage supply switch in which a contact 146 is connected to said rectifier and the other contact 145 is connected directly to input point 35 of cathode 4 of a cathode ray tube 13. Switching arm 147 of B-voltage supply switch 144 is connected to a smoothing circuit consisting of capacitors 148 and 149 and a choke coil 150. The output 151 of said smoothing circuit is used as a B-voltage supply. B-voltage supply switch 144 is interlocked with the main switch of the television receiver. When the main switch is opened, switching arm 147 of said B-voltage supply switch is changed over to contact 145. Other notations are the same as in FIG. 1.

The operation of this invention is next described with regard to the aforementioned circuit. When the main switch of the AC supply is switched off, switching arm 147 of said B-voltage supply switch interlocked with said main switch is changed over from contact 146 to contact 145. At this instant, the positive charge stored in capacitor 28 is discharged to the ground through brightness control resistor 24 and also through bias resistor 22, B-voltage supply switch 144 and capacitor 148 which has a large capacitance. Since this discharge is performed without giving potential to cathode 4, the cathode potential falls instantaneously to zero which is the same level as is on the first grid. In this case, capacitor 148 is not charged because of its extremely large capacitance which is, for example, about 3500 $\mu$f. Since the above-said condition is easily implemented regardless of the position of the slider 23 of the brightness control resistor, cathode 4 of the cathode ray tube is put at nearly zero potential immediately when the AC supply is cut off. Thus, since no potential difference is applied between cathode 4 and the first grid, the bias becomes extremely weak and the electron beam increases rapidly. As a result, the positive charge on anode 14 is rapidly discharged whereby the bright spot vanishes almost immediately. This function is markedly effective.

In this circuit, contact 145 of B-voltage supply switch 144 may be connected directly either to output terminal 34 of the slider 23 of said brightness control resistor or to the input terminal 36 of said resistor. However, in these cases, the functional efficiency is again a little less than that in the case where said B-voltage supply switch is connected directly to cathode 4.

In applying the methods of this invention as have been heretofore described, it is again not necessary to increase the time constant provided through resistor 18 and capacitor 21 which are connected to the second grid.

In a transistorized television receiver, the potential at the junction point 36 is about 100 to 150 v., and the potential at the point where capacitor 148 is linked with choke coil 150 is about 12 v. Since there exists a large potential difference between said two points, the aforementioned effect is also satisfactorily obtained when the switch is placed on the off position. However, in a vacuum-tube type television receiver, there exists almost no potential difference between said two points. Therefore, a circuit as in FIG. 3 is not practically effective for the television receiver of the vacuum-tube type.

In connection with this embodiment, there has been described that a video signal is impressed upon the cathode of a cathode ray tube. Additionally, this embodiment can also be applied to an instance in which a video signal is impressed upon the first grid.

There will now be obvious to those skilled in the art many modifications and variations of the above improvements. These modifications and variations will, however, come within the scope of the invention if defined by the following claims.

What is claimed is:

1. A circuit comprising a cathode ray tube including a screen and an anode and electrodes supplying and controlling an electron beam which is accelerated towards the screen at least partly by said anode, control means for selectively activating and deactivating said cathode ray tube, said anode developing an electrical charge which when the cathode ray tube is deactivated continues to accelerate said beam towards the screen thereby causing a bright spot, said control means including spot elimination means effective on deactivation of said cathode ray tube to enhance the discharging of said anode whereby said bright spot is rapidly eliminated, said control means being a power supply switch partly constituting said spot elimination means and adapted for coupling said one electrode to ground, and a power supply and smoothing means, said switch being connected by the latter said means to ground.

2. A circuit as claimed in claim 1 wherein said one electrode is a cathode.

References Cited

UNITED STATES PATENTS

| | | | |
|---|---|---|---|
| 2,940,004 | 6/1960 | Bonner | 315—20 |
| 3,351,804 | 11/1967 | Kongable et al. | 315—20 |

RODNEY D. BENNETT, Jr., *Primary Examiner.*

CHARLES L. WHITHAM, *Assistant Examiner.*